(12) United States Patent
Morgan et al.

(10) Patent No.: US 7,096,362 B2
(45) Date of Patent: Aug. 22, 2006

(54) INTERNET AUTHENTICATION WITH MULTIPLE INDEPENDENT CERTIFICATE AUTHORITIES

(75) Inventors: Stephen Paul Morgan, San Jose, CA (US); John Irish, Olney, MD (US); Frank Michael Pittelli, Edgewater, MD (US); Michael David Varga, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 09/872,797

(22) Filed: Jun. 1, 2001

(65) Prior Publication Data

US 2002/0184491 A1 Dec. 5, 2002

(51) Int. Cl.
*H04L 9/00* (2006.01)
(52) U.S. Cl. ....................... 713/175; 713/157
(58) Field of Classification Search ........ 713/155–159, 713/168, 175
See application file for complete search history.

(56) References Cited

U.S. PATENT DOCUMENTS

| | | | | |
|---|---|---|---|---|
| 5,659,616 A | * | 8/1997 | Sudia | 705/76 |
| 5,903,882 A | * | 5/1999 | Asay et al. | 705/44 |
| 6,237,023 B1 | * | 5/2001 | Yoshimoto | 709/203 |
| 2001/0009025 A1 | * | 7/2001 | Ahonen | 713/161 |

OTHER PUBLICATIONS

Harkins et al, "RFC 2409—The Internet Key Exchange (IKE)", Network Working Group, Nov. 1999, Retrieved from the Internet on Dec. 15, 2004: <URL:http://www.faqs.org/rfcs/rfc2409.html>.*
Ellison et al, "RFC 2693—SPKI Certificates Theory", Network Working Group, Sep. 1999, Retrieved from the Internet on Dec. 17, 2004: <URL:http://www.faqs.org/rfcs/rfc2693.html>.*
Project P710, Security for the TMN X-Interface, 1998, EURESCOM, Retrieved from the Internet on Apr. 11, 2005: <URL: http://www.eurescom.de/~pub-deliverables/p700-series/p710/D1/Vol2/Vol2.pdf>.*
Project P710—Security for the TMN X-Interface, EURESCOM, 1998, pp. 25-27.*

* cited by examiner

*Primary Examiner*—Gilberto Barron, Jr.
*Assistant Examiner*—Minh Dinh
(74) *Attorney, Agent, or Firm*—John L. Rogitz

(57) ABSTRACT

A system for authentication to support secure data transfer includes a protocol wherein a certificate payload, an ID payload, and a signature payload all respectively contain at least two certificates, IDs, and signatures, concatenated together. The certificates are generated by different certificate authorities (CA) that have no trust relationship with each other. One certificate can be granted to a person and another to a particular host computer intended to be used by the person, so that for secure data transfer to take place, both a certified user and a certified host computer must be involved.

18 Claims, 4 Drawing Sheets

INTERNET AUTHENTICATION WITH MULTIPLE INDEPENDENT CERTIFICATE AUTHORITIES

BACKGROUND OF THE INVENTION

1. Field of the Invention

The present invention relates generally to computer authentication using digitally signed certificates issued by certificate authorities (CA).

2. Description of the Related Art

Remote computer users can be afforded access to a secure network over the Internet by using digital certificates and public key/private key exchange principles. A protocol standard for effecting secure data transfer using these principles is the so-called Internet Engineering Task Force (IETF) Request for Comments (RFC) 2409 "Internet Key Exchange Protocol" ("IKE"), one embodiment of which uses a certificate standard known as the "X.509" standard. See "ITU-T Recommendation X.509 (1997E): Information Technology—Open Systems Interconnection—The Directory: Authentication Framework", June 1997.

In IKE, two entities may generate and exchange cryptographic key data suitable for subsequent encrypted communication over a potentially unsecure network, e.g., the Internet. In essence, four messages are first exchanged, in accordance with Diffie-Hellman principles known in the art (U.S. Pat. No. 4,218,582, "Public key cryptographic apparatus and method"), between the entities, establishing a common symmetric encryption key that will be used to encrypt data during subsequent, secure communication.

Then, two further messages, encrypted with the symmetric key, are exchanged. These messages include signed certificates from each sender, as well as an identifier of each sender and a "cookie" that is transparent to the receiver. The certificate is packaged in a "certificate payload", the signature in a "signature payload", and the identifier in an "identifier payload". The signature itself is derived from a hash of the identifier payload and cookie, with the result being encrypted using the private key associated with a public key in the sender's certificate.

Thus, after sending messages three and four, the keys that will be used to encrypt data for secure transmission are established, with messages five and six exchanging certificates of authenticity, so that each entity can be sure that the other entity is authorized to undertake the subsequent, secure data exchange. Since the details of the certificates and how they are verified in the X.509 certificate scheme is important to the present invention, a discussion of this follows.

Briefly, an entity such as a computer creates a public key and a corresponding private key using public key/private key principle known in the art, see "Applied Cryptography Second Edition: Protocols, algorithms and source code in C," by Bruce Schneier, John Wiley & Sons, 1996. The entity then creates a request to be granted a certificate, where the request comprises an identifier for the entity and the public key. Next, the entity transmits the request to a trusted certificate authority ("CA").

In response to the request, the CA creates a unique proto-certificate that typically includes the entity's name (and perhaps alternate names), a unique serial number, an expiration date of the certificate, the name of the issuing CA, and the entity's public key. The proto-certificate is signed by the issuing CA by applying to the proto-certificate a cryptographic hashing function such as the Secure Hash Algorithm (SHA-1) and then encrypting the resulting hash value with the CA's private key. The actual certificate is created by appending the digital signature to the proto-certificate.

To determine whether a certificate is valid, its expiration is first checked. If the certificate has not expired, its serial number is next checked against a list of revoked certificates that is published by the issuing CA, to ensure that the issuing CA has not revoked the certificate. If these two tests pass, the digital signature portion is decrypted using the CA's public key (which is assumed to be widely known). Then, the certificate (except for the signature portion) is hashed with the same hash function used by the issuing CA in generating the signature. Only if the resulting hash value matches the decrypted signature is the certificate deemed to be valid.

Simply possessing a certificate does not mean that the possessor is the entity to whom the certificate was issued. Accordingly, when a first entity presents its certificate to a second entity, the second entity uses the above process to ensure the certificate itself is valid. Then, the second entity generates a random number known as a nonce and sends the nonce to the first entity, which must encrypt the nonce with the first entity's private key and send the encrypted nonce back to the second entity. The second entity then decrypts the nonce with the first entity's public key that forms part of the certificate, and if the decryption is successful, the second entity may assume that the first entity is the intended possessor of the certificate.

In generating certificates for the above-described protocol, a single CA or a hierarchy of CAs operate in concert to issue certificates. When multiple CAs operate in concert it is usually in a "trust hierarchy", wherein a first CA "trusts" the certificates issued by another CA. A hierarchy of trust ordinarily is established, with the most trusted CA at the root. As understood herein, if the root CA is compromised, the entire system is compromised. Likewise, if a CA that establishes a hierarchy node that is shared by two or more CAs below the node becomes compromised, the two lower CAs are also compromised. This is undesirable in a high security system. The present invention, in recognizing the above-discussed problem, offers the solution or solutions herein.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

In one aspect, a computer authentication protocol is disclosed that includes sending a certificate payload from a transmitting computer to a receiving computer. As intended by the present invention, the certificate payload includes at least two certificates, with each certificate being generated by a respective certificate authority (CA). As also contemplated herein, the certificate authorities are independent of each other such that no trust relationship exists between the CAs.

In a preferred embodiment, the certificates are concatenated together. As set forth further below, one certificate is associated with a person (user) and one certificate is associated with a host computer.

In addition to the certificate payload, an identification (ID) payload is sent from one computer to the other. The ID payload is generated by combining the IDs of the entities associated with the certificates in the certificate payload. Moreover, a signature payload is sent from one computer to the other, with the signature payload being generated by concatenating the signatures of the entities. In a particularly preferred embodiment, each signature is formed by applying a pseudorandom function (PRF) to the associated ID to render a result, and then encrypting the result with a private key associated with the entity represented by the ID. The receiving entity, typically a trusted domain gateway, in return can send the present compound payloads or it can send a conventional one-certificate payload.

In another aspect, a computer program device includes a computer program storage device that in turn includes a program of instructions which are usable by an encryption computer. The program includes logic means for combining a first entity identification (ID) with a second entity ID to render an ID payload. Logic means send the ID payload to a computer along with at least one certificate payload.

In yet another aspect, a computer program device includes a computer program storage device that in turn includes a program of instructions which are usable by an encryption computer. The program includes logic means for generating a signature payload by concatenating at least two signatures of respective entities.

In another aspect, a computer system for secure network authentication includes at least one host certificate authority (CA) generating a host authentication certificate for at least one host computer. Also, at least one user CA generates a user authentication certificate for at least one user. The certificates can be combined into a certificate payload during an authentication process. The host CA is not in a trust relationship with the user CA and vice-versa.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
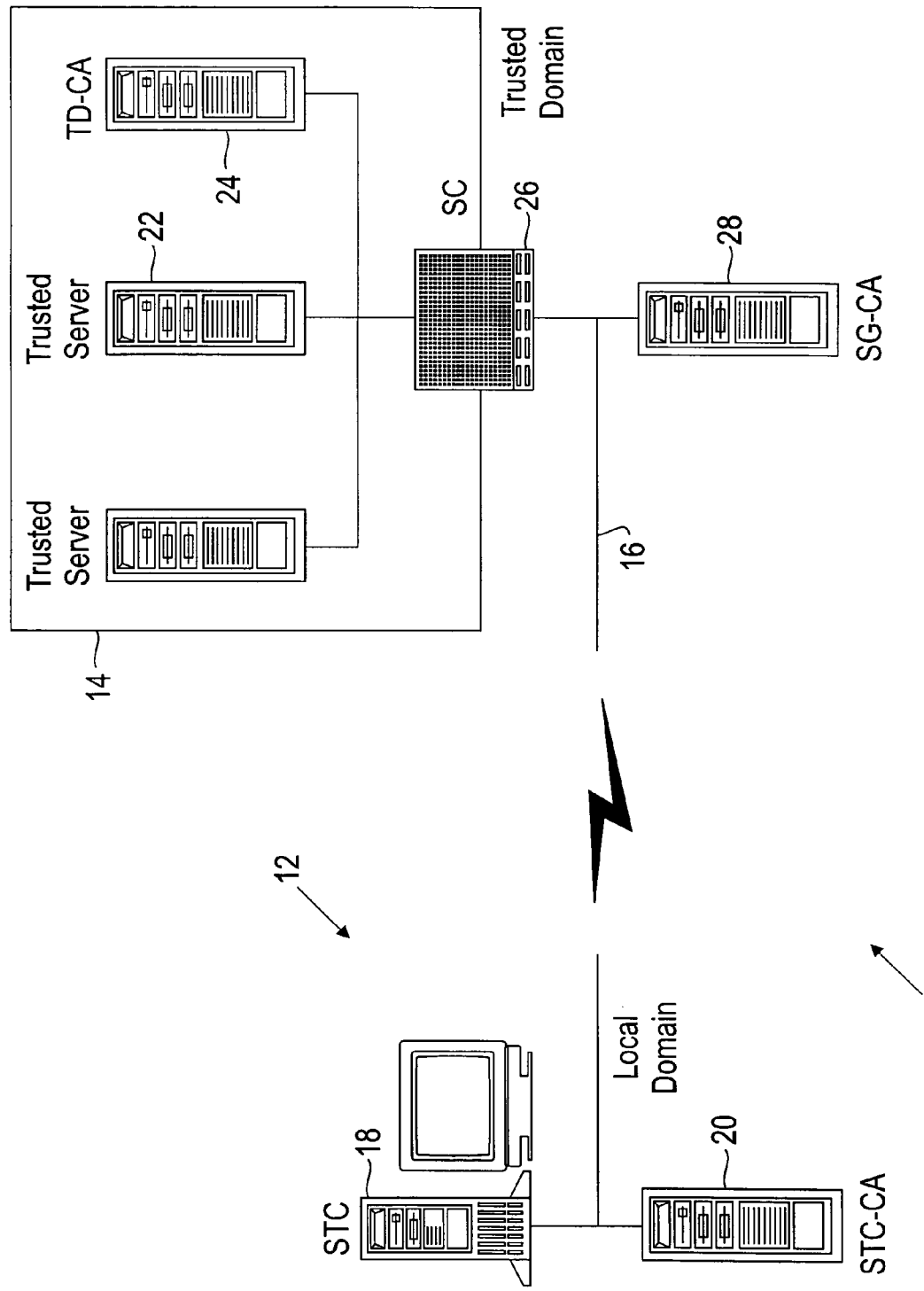
FIG. 1 is a block diagram of the present system.

Referring initially to FIG. 1, a system is shown, generally designated 10, for securely transmitting data using the digital certificate protocol disclosed herein. As shown, the system 10 includes one or more local domains 12 (only a single domain 12 is shown in FIG. 1) and one or more trusted, i.e., secure, domains 14 (only a single domain 14 is shown in FIG. 1). Secure data transfer between the domains 12, 14 can be effected via the Internet 16 using the present invention.

The local domain 12 includes at least one host computer 18. The host computer 18 can be any appropriate network device, such as a secure thin client (STC). Associated with the local domain 12 and communicating with the host computer 18 is a local certificate authority (CA) 20. The local CA 20 generates certificates for the host computer 18.

The trusted domain 14, on the other hand, typically includes one or more trusted servers 22 and a trusted domain CA 24, all located behind a proxy referred to as a secure gateway 26. A local CA 28 generates certificates for the gateway 26, and the trusted domain CA generates certificates for individual people ("users") to whom it is desired to grant access to the trusted domain 14. At least the trusted domain CA 24 and the local CA 20 are independent of each other, that is, neither has a trust relationship with the other. The local CA 20 might have a trust relationship with the local CA 28.

It is to be understood that the computers of the present invention undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

Figure 2:
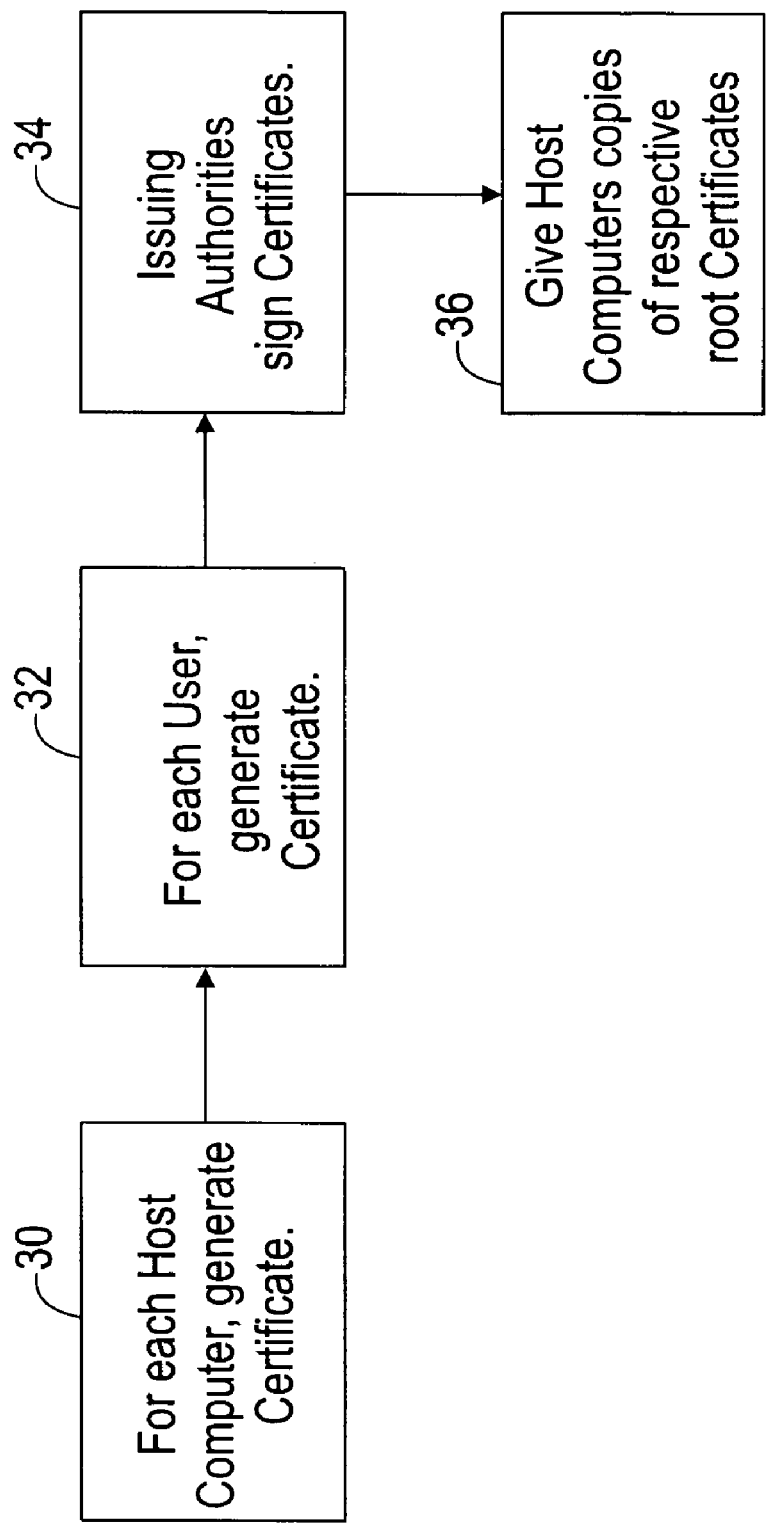
FIG. 2 is a flow chart of the set up logic.

FIG. 2 shows the logic for initially setting up the authentication tools in the system 10. Commencing at block 30, a certificate can be generated for each host computer 18 by the respective local CA 20. Also, at block 32, a certificate is generated by the trusted domain CA 24 for each user to whom access to the trusted domain 14 is to be granted. The certificates are signed as appropriate at block 34 by the respective CAs.

Figure 3:
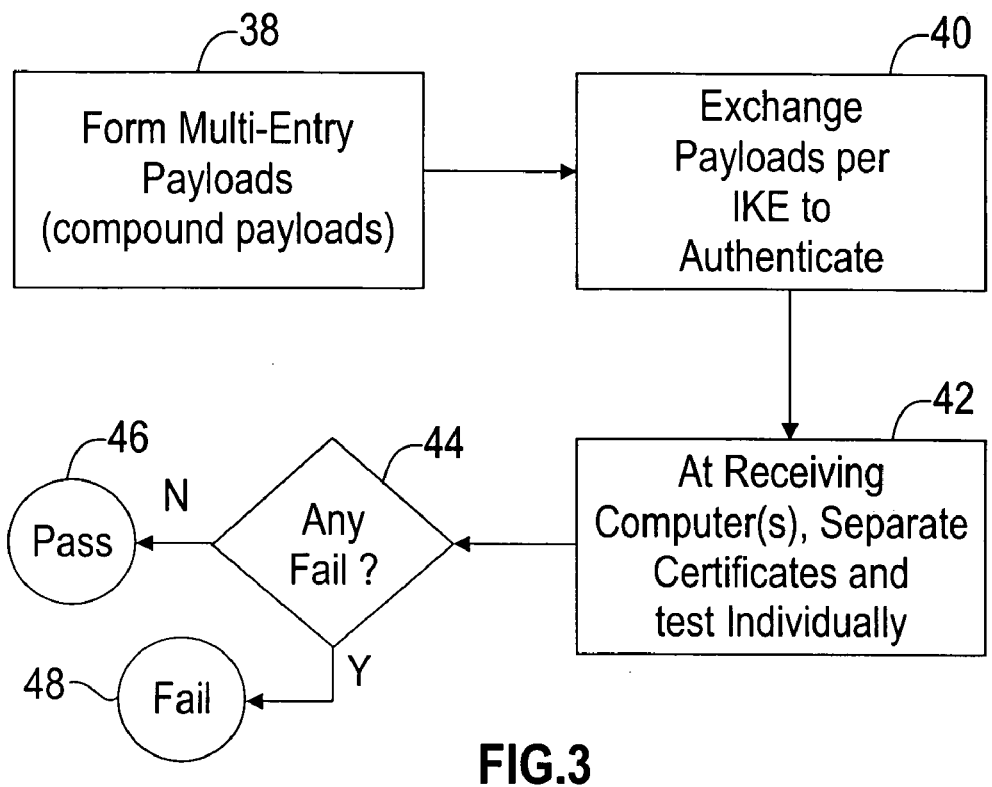
FIG. 3 is a flow chart overall authentication logic.

The overall logic for authentication is shown in FIG. 3. Commencing at block 38, multi-entity payloads are formed at a host computer having a user seeking to access the trusted domain 14. These payloads include a certificate payload, an identification (ID) payload, and a signature payload, with the payloads being transmitted in accordance with the IKE protocol discussed above. However, the present payloads differ from conventional payloads in that the present payloads are compound. For instance, the certificate payload includes not one but two or more certificates concatenated together. In the simplest example, the present certificate payload is a concatenation of the user certificate with the host computer 18 certificate. Generation of the present compound ID payload and compound signature payload is discussed further below.

Moving to block 40, the payloads are exchanged per the above-mentioned IKE protocol to authenticate the user/host computer to the security gateway 26 and vice-versa. While only one certificate need be sent in accordance with conventional X.509 principles by the security gateway 26 (in which case certificate exchange is asymmetric), the security gateway 26 may also be required to use the present compound payloads, in which case the exchange is symmetric. The principles herein apply to either case, as long as at least one set of compound payloads is used.

After payload exchange, the logic moves to block 42, wherein at computers that receive compound payloads, the certificates in certificate payload are separated from each other and tested separately. To undertake this test in accordance with IKE principles, the IDs in the ID payload and the signatures in the signature payload are also separated from each other. One way to match a certificate-ID-signature set is to concatenate the IDs together and signatures together in the same order in which the certificates are concatenated, so upon separation the certificate-ID-signature sets register. If any test fails at decision diamond 44, "fail" is returned at state 48. Otherwise, "pass" is returned at state 46. Thus, should any one CA be compromised, certificates in the compound certificate payload from non-compromised CAs (which, it will be recalled, are not in a trust relationship with the compromised CA) will prevent unauthorized access to the trusted domain 14.

Figure 4:
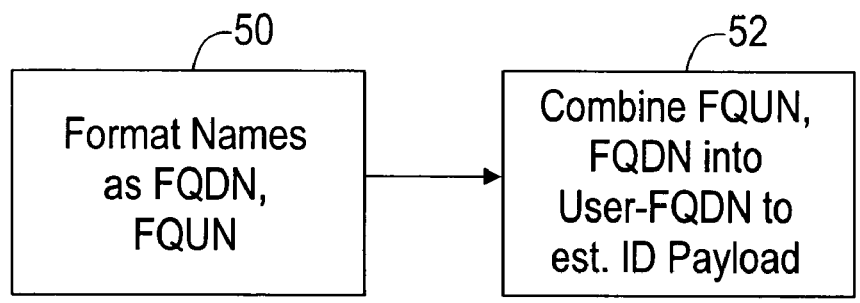
FIG. 4 is a flow chart showing the logic for forming the identification (ID) payload.

FIG. 4 shows the logic for forming the ID payload. Commencing at state 50, the alternative name and the domain name from the user's certificate are together formatted as a fully qualified user name (FQUN) and the host name and the domain name from the host computer's certificate are together formatted as a fully qualified domain name (FQDN). As an example, if a user is assigned the name "smith" by the trusted CA 24 having, e.g., the name "trusted", and the host computer is assigned the name "host" by the local CA 20 having a name of "local", the user may be assigned the FQUN "smith.trusted" and the host computer may be assigned the FQDN "host.local".

Moving to block 52, the FQUN and the FQDN are combined into a user fully qualified domain name (UFQDN) to establish the ID payload. Using the above FQUN and FQDN as an example, the UFQDN would be "smith.trusted@host.local". In any case, certificates are combined using, in one non-limiting preferred embodiment, the names of the certificates, to render a certificate payload. In the case of more than two certificates being used, the ID payload may be formed by combining the individual identifiers in accordance with the above principles.

Figure 5:
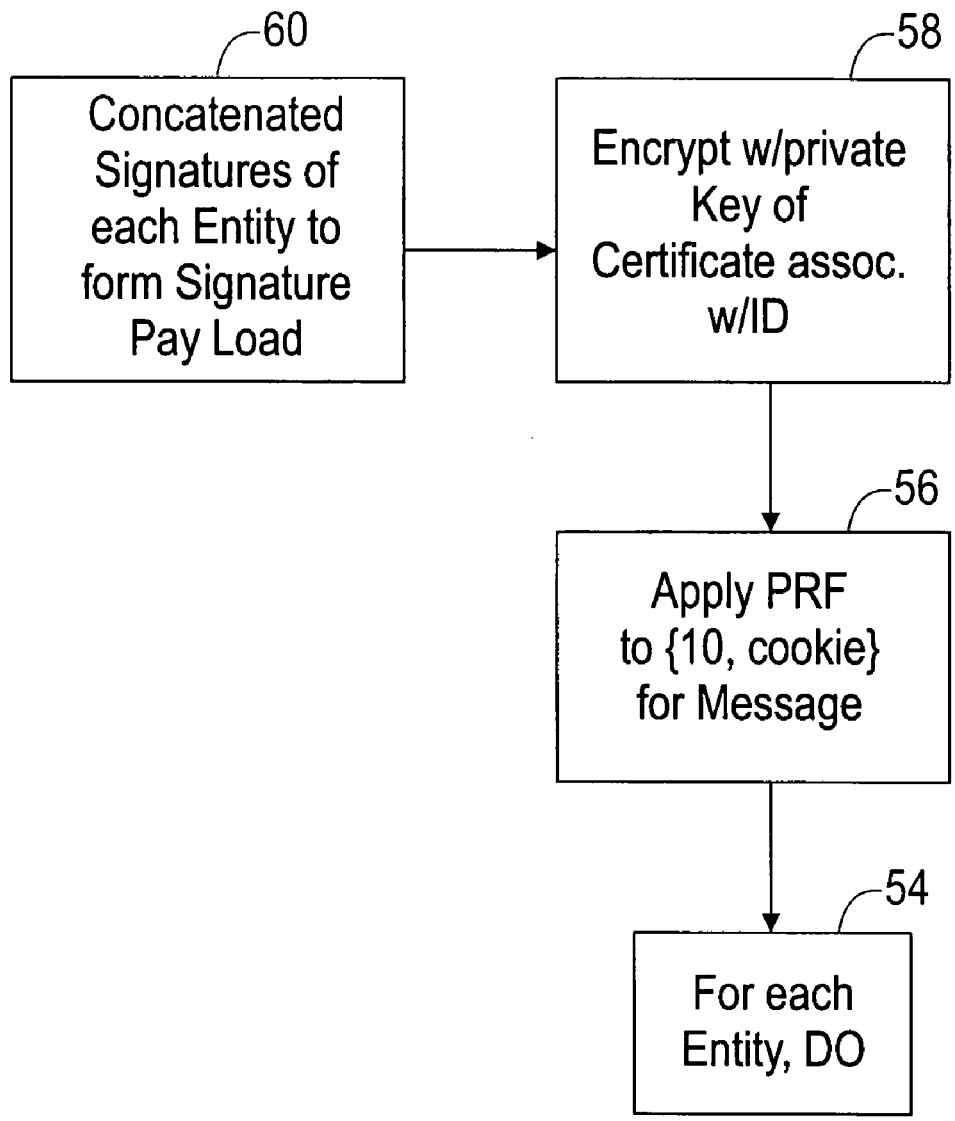
FIG. 5 is a flow chart showing the logic for forming the signature payload.

Now referring to FIG. 5, the logic for forming the signature payload can be seen. Commencing at block 54, a DO loop is entered for each entity (i.e., user or host computer) having a corresponding certificate in the certificate payload. Moving to block 56, a pseudorandom function (PRF) is applied to the {ID, cookie} combination of the entity in accordance with IKE principles. The cookie is the one received in the above-mentioned fifth message of the Diffie-Hellman key exchange. The result is then encrypted at block 58 with the private key of the entity, i.e., the private key associated with the public key contained in the corresponding certificate. Then, at block 60 the individual signatures so generated are concatenated together to form the signature payload.

While the particular INTERNET AUTHENTICATION WITH MULTIPLE INDEPENDENT CERTIFICATE AUTHORITIES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer authentication protocol, comprising:
    sending at least one certificate payload from a transmitting computer to a receiving computer, the certificate payload including at least two certificates each being generated by a respective certificate authority (CA), the certificate authorities being independent of each other such that no trust relationship exists between the CAs.

2. The protocol of claim 1, wherein the certificates are concatenated together.

3. The protocol of claim 2, wherein at least one certificate is associated with a person and one certificate is associated with a host computer.

4. The protocol of claim 1, further comprising sending at least one identification (ID) payload between the computers, the ID payload being generated by combining the IDs of at least two entities.

5. The protocol of claim 4, further comprising sending at least one signature payload between the computers, the signature payload being generated by concatenating the signatures of at least two entities.

6. The protocol of claim 5, wherein each signature is formed by applying a pseudorandom function (PRF) to at least the associated ID to render a result, and then encrypting the result with a private key associated with the entity represented by the ID.

7. A computer program device, comprising:
    a computer program storage device including a program of instructions usable by a computer, comprising:
    logic means for combining a first entity identification (ID) with a second entity ID to render an ID payload; and
    logic means for sending the ID payload to a computer along with at least one certificate payload.

8. The computer program device of claim 7, further comprising:
    logic means for generating a signature payload by concatenating at least two signatures of respective entities.

9. The computer program device of claim 8, wherein the means for generating a signature payload applies a pseudorandom function (PRF) to at least an ID associated with an entity to render a result, and then encrypting the result with a private key associated with the entity represented by the respective ID.

10. A computer program device, comprising:
    a computer program storage device including a program of instructions usable by a computer, comprising:
    logic means for generating a signature payload by concatenating at least two signatures of respective entities; and
    logic means for sending the signature payload to a computer along with at least one certificate payload.

11. The computer program device of claim 10, wherein the means for generating a signature payload applies a pseudorandom function (PRF) to at least an ID associated with an entity to render a result, and then encrypting the result with a private key associated with the entity represented by the respective ID.

12. The computer program device of claim 11, further comprising:
   logic means for combining a first entity ID with a second entity ID to render an ID payload; and
   logic means for sending the ID payload to a computer along with at least one certificate payload.

13. A computer system for secure network authentication, comprising:
   at least one host certificate authority (CA) generating a host authentication certificate for at least one host computer; and
   at least one user CA generating a user authentication certificate for at least one user, wherein the certificates can be combined into a certificate payload during an authentication process, the host CA not being in a trust relationship with the user CA and vice-versa.

14. The system of claim 13, wherein the certificates are concatenated together to establish a certificate payload.

15. The system of claim 14, wherein at least one certificate is associated with a person and one certificate is associated with a host computer.

16. The system of claim 13, wherein the system sends at least one identification (ID) payload between the computers, the ID payload being generated by combining the IDs of at least two entities.

17. The system of claim 16, wherein the system sends at least one signature payload between the computers, the signature payload being generated by concatenating the signatures of at least two entities.

18. The system of claim 17, wherein each signature is formed by applying a pseudorandom function (PRF) to at least the associated ID to render a result, and then encrypting the result with a private key associated with the entity represented by the ID.

* * * * *

UNITED STATES PATENT AND TRADEMARK OFFICE
CERTIFICATE OF CORRECTION

| | | |
|---|---|---|
| PATENT NO. | : 7,096,362 B2 | Page 1 of 1 |
| APPLICATION NO. | : 09/872797 | |
| DATED | : August 22, 2006 | |
| INVENTOR(S) | : Stephen Paul Morgan et al. | |

It is certified that error appears in the above-identified patent and that said Letters Patent is hereby corrected as shown below:

Column 1, line 4:
Following the title, please insert:

STATEMENT REGARDING FEDERALLY SPONSORED RESEARCH
This invention was made with Government support under contract MDA904-98-C-A919 awarded by the National Security Agency. The Government has certain rights in this invention.

Signed and Sealed this

Nineteenth Day of December, 2006

JON W. DUDAS
*Director of the United States Patent and Trademark Office*